United States Patent
Dong et al.

(10) Patent No.: US 12,524,165 B2
(45) Date of Patent: Jan. 13, 2026

(54) SOFT DECODING IN MEMORY SYSTEMS

(71) Applicant: Yangtze Memory Technologies Co., Ltd., Hubei (CN)

(72) Inventors: Wenwen Dong, Wuhan (CN); Yahai Liu, Wuhan (CN); Weijun Wan, Wuhan (CN); Weihua Shi, Wuhan (CN); Wei Huang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/797,413

(22) Filed: Aug. 7, 2024

(65) Prior Publication Data

US 2026/0010295 A1 Jan. 8, 2026

(30) Foreign Application Priority Data

Jul. 5, 2024 (CN) .......................... 202410897697.0

(51) Int. Cl.
 G06F 12/00 (2006.01)
 G06F 3/06 (2006.01)
(52) U.S. Cl.
 CPC .......... G06F 3/0619 (2013.01); G06F 3/0659 (2013.01); G06F 3/0679 (2013.01)

(58) Field of Classification Search
None
See application file for complete search history.

(56) References Cited

U.S. PATENT DOCUMENTS

| | | | |
|---|---|---|---|
| 2020/0104209 A1* | 4/2020 | El Gamal | G11C 29/52 |
| 2021/0191651 A1* | 6/2021 | Sharon | G06F 3/0659 |
| 2022/0139468 A1* | 5/2022 | Fitzpatrick | G06F 3/0659 |
| | | | 711/154 |

* cited by examiner

*Primary Examiner* — Daniel D Tsui
(74) *Attorney, Agent, or Firm* — Fish & Richardson P.C.

(57) ABSTRACT

The present disclosure involves methods, apparatuses, and systems for performing soft decoding in a memory system. In one example, a method for a memory system includes sending, by a memory controller, a read command to a memory device. The method further includes storing, by the memory device based on the read command, first soft data in a first latch, second soft data in a second latch, and hard data in a third latch. The method further includes sending, by the memory controller, a first page transfer command to the memory device, wherein the first page transfer command indicates a selected latch from the first latch, the second latch, or the third latch to transfer data in the selected latch to a cache latch.

20 Claims, 10 Drawing Sheets

| | | | | |
|---|---|---|---|---|
| B5h | RL1_neg | RL1_pos | RL5_neg | RL5_pos | SBR Offset for TLC LP read level | 10.0 mV per step, range : 0V to 1.27V |
| B6h | RL2_neg | RL2_pos | RL4_neg | RL4_pos | SBR Offset for TLC MP read level | 10.0 mV per step, range : 0V to 1.27V |
| B7h | RL6_neg | RL6_pos | Reserved | Reserved | SBR Offset for TLC MP read level | 10.0 mV per step, range : 0V to 1.27V |
| B8h | RL3_neg | RL3_pos | RL7_neg | RL7_pos | SBR Offset for TLC UP read level | 10.0 mV per step, range : 0V to 1.27V |

FIG. 10

| E2h | RL1_neg | RL1_pos | RL5_neg | RL5_pos | MBR Offset for TLC LP read level | 10.0 mV per step, range : 0V to 1.27V |
|---|---|---|---|---|---|---|
| E3h | RL2_neg | RL2_pos | RL4_neg | RL4_pos | MBR Offset for TLC MP read level | 10.0 mV per step, range : 0V to 1.27V |
| E4h | RL6_neg | RL6_pos | Reserved | Reserved | MBR Offset for TLC MP read level | 10.0 mV per step, range : 0V to 1.27V |
| E5h | RL3_neg | RL3_pos | RL7_neg | RL7_pos | MBR Offset for TLC UP read level | 10.0 mV per step, range : 0V to 1.27V |

FIG. 11

SOFT DECODING IN MEMORY SYSTEMS

CROSS-REFERENCE TO RELATED APPLICATIONS

This application claims priority to Chinese Patent Application No. 202410897697.0, filed on Jul. 5, 2024, which is hereby incorporated by reference in its entirety.

TECHNICAL FIELD

The present disclosure generally relates to memory devices and memory systems, and in particular, to soft decoding in memory systems.

BACKGROUND

A memory system can include one or more memory devices and a memory controller that manages the data stored in the one or more memory devices and communicates with a host. The host can send commands, for example, read or write commands, to the memory system to read data from or write data to the one or more memory devices. The memory system can generate corresponding responses and send the responses to the host. The host can use interrupts to handle the responses received from the memory system.

SUMMARY

The present disclosure involves methods, apparatuses, and computer-readable storage media for soft decoding in a memory system. In one example, a method for a memory system includes sending, by a memory controller, a read command to a memory device. The method further includes storing, by the memory device based on the read command, first soft data in a first latch, second soft data in a second latch, and hard data in a third latch. The method further includes sending, by the memory controller, a first page transfer command to the memory device, where the first page transfer command indicates a selected latch from the first latch, the second latch, or the third latch to transfer data in the selected latch to a cache latch.

One aspect of the present disclosure features a method including sending, by a memory controller, a read command to a memory device. The method further includes storing, by the memory device based on the read command, first soft data in a first latch, second soft data in a second latch, and hard data in a third latch. The method further includes sending, by the memory controller, a first page transfer command to the memory device, where the first page transfer command indicates a selected latch from the first latch, the second latch, or the third latch to transfer data in the selected latch to a cache latch.

Another aspect of the present disclosure features a memory device including a memory cell array and a peripheral circuit, where the memory cell array includes memory cells. The peripheral circuit is configured to receive a read command from a memory controller. The peripheral circuit is further configured to store, based on the read command, first soft data in a first latch, second soft data in a second latch, and hard data in a third latch. The peripheral circuit is further configured to receive a first page transfer command from the memory controller, where the first page transfer command indicates a selected latch from the first latch, the second latch, or the third latch to transfer data in the selected latch to a cache latch.

Another aspect of the present disclosure features a memory system. The memory system includes a memory device including a memory cell array, where the memory cell array includes memory cells, and a memory controller coupled to the memory device. The memory system is configured to perform operations including sending, by the memory controller, a read command to the memory device. The operations further include storing, by the memory device based on the read command, first soft data in a first latch, second soft data in a second latch, and hard data in a third latch. The operations further include sending, by the memory controller, a first page transfer command to the memory device, where the first page transfer command indicates a selected latch from the first latch, the second latch, or the third latch to transfer data in the selected latch to a cache latch.

The foregoing and other described aspects of the present disclosure can each, optionally, include one or more of the following features.

In some implementations, the method includes copying, by the memory device based on the first page transfer command, the hard data from the third latch to the cache latch. The method further includes sending, by the memory controller, a first read-out command to the memory device. The method further includes sending, by the memory device, a portion of the hard data from the cache latch to the memory controller, where a size of the portion of the hard data is less than or equal to a cache size of the memory controller, and a size of the hard data is larger than the cache size of the memory controller.

In some implementations, the method includes sending, by the memory controller, a second page transfer command to the memory device, where the second page transfer command indicates the first latch is selected to transfer data from the first latch to the cache latch. The method further includes copying, by the memory device based on the second page transfer command, the first soft data from the first latch to the cache latch. The method further includes sending, by the memory controller, a second read-out command to the memory device. sending, by the memory device, a portion of the first soft data from the cache latch to the memory controller.

In some implementations, the method includes sending, by the memory controller, a third page transfer command to the memory device, where the third page transfer command indicates the second latch is selected to transfer data from the second latch to the cache latch. The method further includes copying, by the memory device based on the third page transfer command, the second soft data from the second latch to the cache latch. The method further includes sending, by the memory controller, a third read-out command to the memory device. The method further includes sending, by the memory device, a portion of the second soft data from the cache latch to the memory controller.

In some implementations, the method includes performing, by the memory controller, soft decoding based on the portion of the hard data, the portion of the first soft data, and the portion of the second soft data.

In some implementations, the method includes determining, by the memory controller, whether all of the hard data stored in the third latch have been read. The method further includes in response to determining that not all of the hard data in the third latch have been read, sending, by the memory controller, a fourth page transfer command to the memory device, where the fourth page transfer command indicates the third latch is selected to transfer data from the third latch to the cache latch. The method further includes copying, by the memory device based on the fourth page transfer command, the hard data from the third latch to the cache latch. The method further includes sending, by the memory controller, a fourth read-out command to the memory device. The method further includes sending, by the memory device, a second portion of the hard data from the cache latch to the memory controller.

In some implementations, the first soft data is generated based on an XOR operation of two pieces of soft data.

In some implementations, the method includes reading, by the memory device, a first piece of soft data. The method further includes reading, by the memory device, a second piece of soft data. The method further includes performing, by the memory device, the XOR operation on the first piece of soft data and the second piece of soft data to generate the first soft data.

In some implementations, the read command is a soft data multiple bit read command.

In some implementations, the method further includes in response to receiving the read command, generating, by the memory device, the first soft data, the second soft data, and the hard data.

In some implementations, the first page transfer command includes an address of a portion of data in the selected latch to be sent from the cache latch to the memory controller.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIG. 10 shows an example table for soft data single bit read offset, in accordance with some aspects of the present disclosure; and FIG. 11 shows an example table for soft data multiple bit read offset, in accordance with some aspects of the present disclosure.

Like reference numbers and designations in the various drawings indicate like elements.

DETAILED DESCRIPTION

Figure 1:
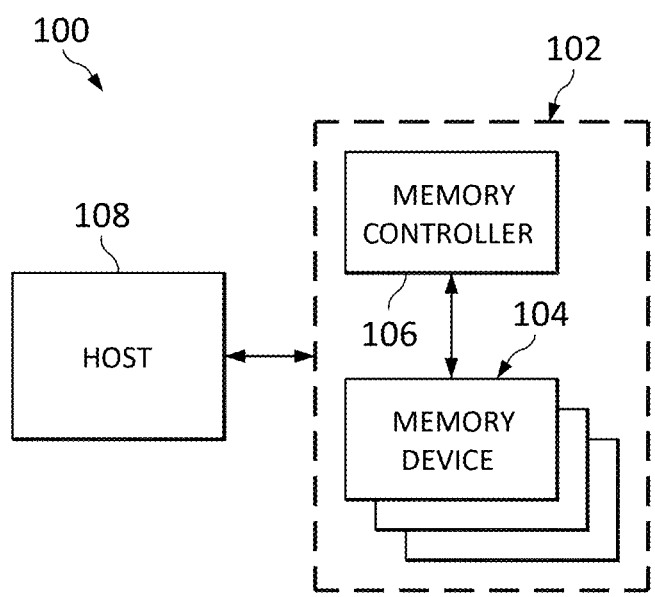
FIG. 1 illustrates a block diagram of an example system having a memory device, in accordance with some aspects of the present disclosure.

Soft decoding can be used to recover data in a memory device. In some cases, a soft decoding operation needs a piece of hard data and two pieces of soft data. In some implementations, for each piece of the soft data, another two pieces of soft data with different offsets may need to be read to generate the piece of soft data. Therefore, in some cases, four pieces of soft data and one piece of hard data may need to be read in a soft decoding operation.

In some implementations, a normal data page read protocol can be employed for the soft decoding. In the normal data page read protocol, a memory controller sends a read command to a memory device. The memory device reads a page of hard data and stores it in a cache latch of the memory device (e.g., a page buffer of the memory device). The memory controller can then send a read-out command to obtain the hard data. In some cases, the cache size of the memory controller is smaller than the size of the cache latch. So the memory controller can obtain only a portion of the hard data stored in the cache latch using each read-out command, and store the portion of the hard data in the cache of the memory controller.

The memory controller can then send another read command to the memory device to obtain a portion of soft data corresponding to the portion of the hard data. The memory device reads a page of soft data ($SD_{11}$) and stores it in the cache latch to replace the hard data previously stored in the cache latch. The memory controller can then send a read-out command to obtain a portion of the $SD_{11}$. Using similar process, the memory controller can obtain a portion of another page of soft data ($SD_{12}$), which replaces the $SD_{11}$ previously stored in the cache latch. The $SD_{11}$ and $SD_{12}$ can be associated with the same soft data but have different offsets.

Using similar process for reading out the portion of $SD_{11}$ and the portion of $SD_{12}$, the memory controller can read out a portion of a page of soft data $SD_{21}$ and a portion of a page of soft data $SD_{22}$. The memory controller can then perform a soft decoding using the five pieces of data: a portion of the hard data, a portion of $SD_{11}$, a portion of $SD_{12}$, a portion of $SD_{21}$, and a portion of $SD_{22}$. The above process can take at least 5 times of tR, where tR represents the time for a single read operation (e.g., of a page)—1 tR for hard data and 4 tR for soft data.

As noted, in some cases, the cache size of the memory controller is smaller than the size of the cache latch. Therefore, to read out all data in a page of data, the above process may need to be repeated multiple times. For example, if the cache size of the memory controller is 2 KB and the size of the cache latch is 16 KB, the above process needs to be performed 8 times, totaling 40 tR and 5 tPDO, where tPDO represents the time for performing a page data out (1 tPDO for a page of hard data and 4 tPDO for 4 pages of soft data).

In other words, performing soft decoding for data recovery of a page of data can take 40 tR and 5 tPDO.

In some implementations, a soft data single bit read protocol can be employed for the soft decoding. The soft data single bit read protocol is similar to the above-described normal data page read protocol, except that the memory controller reads out 2 pages of soft data instead of 4 pages of soft data as in the normal data page read protocol. This can be achieved by having the memory device generate a page of soft data using two pages of soft data having different offsets, and send the generated soft data to the memory controller.

In some implementations, a soft data multiple bit read protocol can be employed for performing soft decoding. In some implementations, the memory controller sends a read command to a memory device. In response to the read command, the memory device stores three pages of data—a page of first soft data, a page of second soft data, and a page of hard data—in three data latches, respectively. The memory controller can then send a page transfer command to the memory device to transfer hard data from the data latch to the cache latch. The memory controller can then send a read-out command to the memory device to transfer a portion of the hard data from the cache latch to the memory controller. Using similar process, the memory controller can read out a portion of the first soft data and a portion of the second soft data. The memory controller can then perform soft decoding on the portion of the hard data, the portion of the first soft data, and the portion of the second soft data. This process can be repeated until all three pages of data have been read out by the memory controller.

In some implementations, different from the normal data page read protocol and the soft data single bit read protocol, the soft data multiple bit read protocol needs only one read command from the memory controller to perform soft decoding on a page of data. Also, in the soft data multiple bit read protocol, the memory controller reads out 3 pages of data instead of 5 pages of data as in the normal data page read protocol. Therefore, the soft data multiple bit read protocol can reduce the overall time for performing soft decoding, which can in turn reduce the power consumptions of the memory system.

For example, if the cache size of the memory controller is 2 KB and the size of the cache latch is 16 KB, the soft data multiple bit read protocol can reduce soft decoding time from 40 tR+5 tPDO as in the normal data page read protocol to 5 tR+24 tPB+3tPDO, where tPB represents the time for one page buffer operation, which can be much faster than the read operation. For example, 24 tPB can be approximately 2 tR. Also, the soft data multiple bit read protocol can reduce data transfer amount from 5 pages of data as in the normal data page read protocol to 3 pages of data, and reduce the time for page data out from 5 tPDO in the normal data page read protocol to 3 tPDO in the soft data multiple bit read protocol.

The above aspects and some other aspects of the present disclosure are discussed in greater detail below.

FIG. 1 illustrates a block diagram of an example system 100 having a memory device, in accordance with some aspects of the present disclosure. System 100 can be a mobile phone, desktop computer, laptop computer, tablet computer, vehicle computer, game console, printer, positioning device, wearable electronic device, smart sensor, Virtual Reality (VR) device, Augmented Reality (AR) device, or any other suitable electronic device having storage therein. As shown in FIG. 1, system 100 can include a host 108 and a memory system 102, memory system 102 having one or more memory devices 104 and a memory controller 106. Host 108 can be, for example, a processor (e.g., a Central Processing Unit (CPU)) or a system on a chip (SoC) (e.g., an Application Processor (AP)) of an electronic device. Host 108 can be configured to send data to memory device 104 or receive data from memory device 104. To send data to memory device 104 or receive data from memory device 104, host 108 can send instructions to memory system 102 in addition to the data.

Memory device 104 can be any memory device disclosed in the present disclosure. As disclosed in detail below, the memory device 104 (e.g., a NAND flash memory device) can support program operation suspension triggered by interrupts.

In some implementations, memory controller 106 is coupled to memory device 104 and host 108, and is configured to control memory device 104. Memory controller 106 can manage data stored in memory device 104 and communicate with host 108. In some implementations, the memory controller 106 is designed for operation in a low duty cycle environment, such as a Secure Digital (SD) card, Compact Flash (CF) card, Universal Serial Bus (USB) flash drive, or other medium for use in electronic devices such as personal computers, digital cameras, mobile phones, and so forth. In some implementations, the memory controller 106 is designed for operation in a high duty cycle environment SSD or embedded multimedia card (eMMC) that is used as a data store and enterprise storage array for mobile devices such as smart phones, tablet computers, laptop computers, and the like.

The memory controller 106 can be configured to control the operation (e.g., read, erase, and program operations) of the memory device 104. For example, based on instructions received from host 108, memory controller 106 can transmit various commands (e.g., program commands, read commands, erase commands, etc.) to memory device 104 to control the operation of memory device 104. Consistent with the scope of the present disclosure, in some implementations, memory controller 106 transmits a program command to memory device 104 to initiate a program operation to be performed by memory device 104. During an ongoing program operation, an interrupt (e.g., a read operation to another page) may occur, for example, from host 108. Memory controller 106 may be configured to transmit an interrupt command to memory device 104 to suspend the program operation. In some implementations, upon completion of other operations triggered by the interrupt, the memory controller 106 also can be configured to transmit a resume command to the memory device 104 to resume and complete the suspended program operation.

The memory controller 106 can also be configured to manage various functions with respect to data stored or to be stored in the memory devices 104, including but not limited to bad block management, garbage collection, logical to physical address translation, wear leveling, and the like. In some implementations, the memory controller 106 is also configured to process Error Correction Codes (ECC) with respect to data read from the memory device 104 or written to the memory device 104. The memory controller 106 can also perform any other suitable functions, such as formatting the memory device 104. The memory controller 106 can communicate with external devices (e.g., the host 108) according to a particular communication protocol. For example, the memory controller 106 can communicate with the external device via at least one of various interface protocols, such as a USB protocol, an MMC protocol, a Peripheral Component Interconnect (PCI) protocol, a PCI express (PCI-E) protocol, an Advanced Technology Attachment (ATA) protocol, a serial ATA protocol, a parallel ATA protocol, a small computer system small interface (SCSI) protocol, an Enhanced Small Disk Interface (ESDI) protocol, an Integrated Drive Electronics (IDE) protocol, a Firewire protocol, and so forth.

Figure 2A:
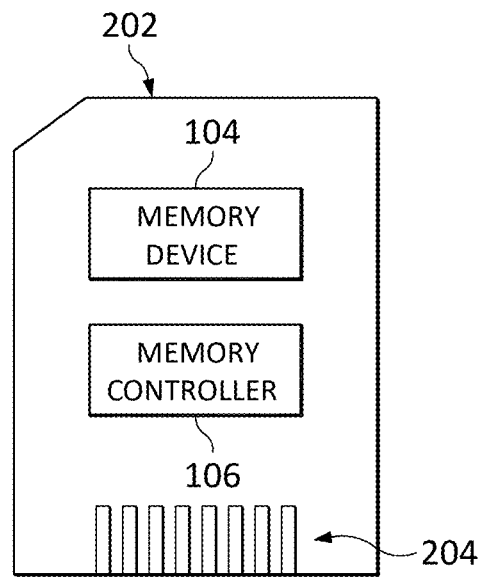
FIG. 2A illustrates a diagram of an example memory card having a memory device, in accordance with some aspects of the present disclosure.
Figure 2B:
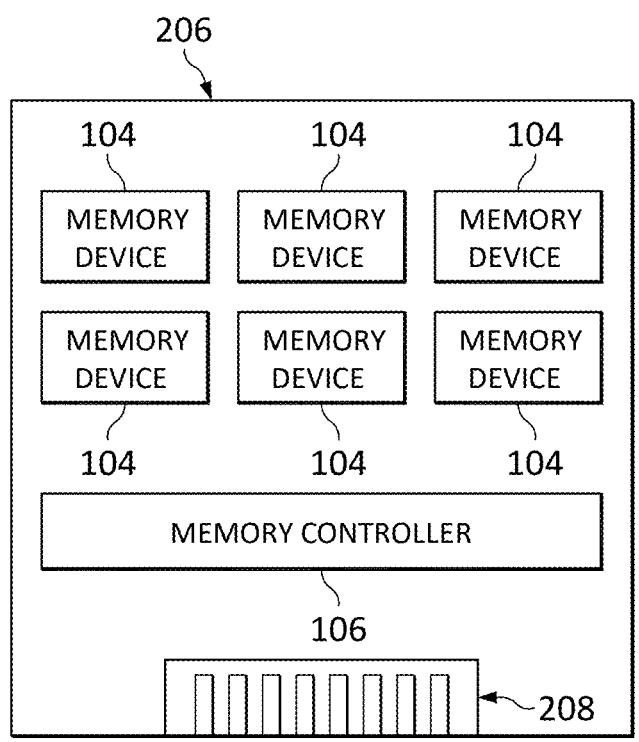
FIG. 2B illustrates a diagram of an example solid-state drive (SSD) having a memory device, in accordance with some aspects of the present disclosure.

The memory controller 106 and the one or more memory devices 104 can be integrated into various types of storage devices and can be included, for example, in the same package (e.g., a Universal Flash Storage (UFS) package or an eMMC package). That is, the memory system 102 can be implemented and packaged into different types of end electronic products. In one example as shown in FIG. 2A, the memory controller 106 and the single memory device 104 can be integrated into a memory card 202. The memory card 202 can include a PC card (PCMCIA), a CF card, a Smart Media (SM) card, a memory stick, a multimedia card (MMC, RS-MMC, MMCmicro), an SD card (SD, miniSD, microSD, SDHC), a UFS, and the like. Memory card 202 can also include a memory card connector 204 configured to couple memory card 202 to a host (e.g., host 108 in FIG. 1). In another example as shown in FIG. 2B, the memory controller 106 and multiple memory devices 104 can be integrated into the SSD 206. SSD 206 can also include an SSD connector 208 configured to couple SSD 206 to a host (e.g., host 108 in FIG. 1). In some implementations, the storage capacity and/or operating speed of SSD 206 is greater than the respective storage capacity and/or operating speed of memory card 202.

Figure 3:
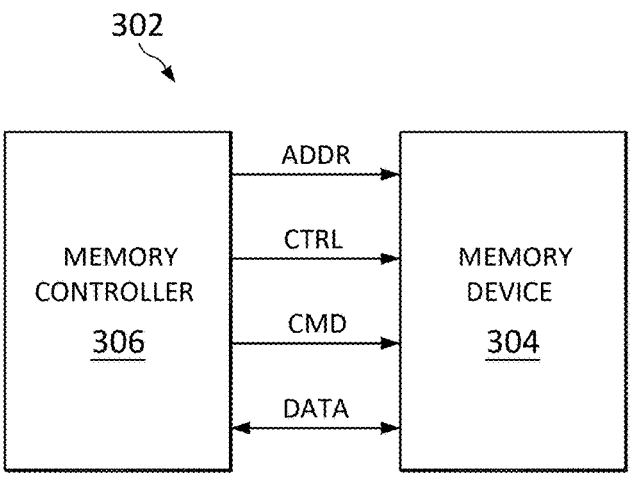
FIG. 3 illustrates a block diagram of an example memory system, in accordance with some aspects of the present disclosure.

FIG. 3 illustrates a block diagram of an example memory system 302, in accordance with some aspects of the present disclosure. As illustrated, the memory system 302 includes a memory controller 306 and a memory device 304. The memory controller 306 and memory device 304 can be example implementations of the memory controller 106 and the memory device 104 discussed in connection with FIG. 1 and FIGS. 2A and 2B.

The memory controller 306 can exchange data with the memory device 304, for example, in response to a request from a host (e.g., host 108 in FIG. 1). As an example, the memory controller 306 can read data from the memory device 304 in response to a request from the host and can provide the read data to the host. As another example, the memory controller 306 can write or program data in the memory device 304 in response to a program request from the host.

In some implementations, to perform the above-described operations, the memory controller 306 can provide signals, such as an address (ADDR), a command (CMD), and a control signal (CTRL), to the memory device 304 and can exchange data (DATA) with the memory device 304. The memory device 304 can output data or can program received data in response to the signals received from the memory controller 306.

The memory controller 306 can provide the memory device 304 with a read command, a program command, an erase command, or the like as the command. For example, the memory controller 306 can request a program operation of a word line unit of the memory device 304 through the program command. The memory controller 306 can transmit one or more addresses representing one or more word lines on which the program operation is performed such that programming is performed on memory cells on the one or more word lines of a memory block of the memory device 304 indicated by the one or more addresses ADDR. As another example, the memory controller 306 can request a read operation to read data stored in memory cells on one or more word lines of the memory device 304 through the read command. As another example, the memory controller 306 can request an erase operation to erase data programed in memory cells of one or more memory blocks or sub block units of the memory device 304 through the erase command.

Figure 4:
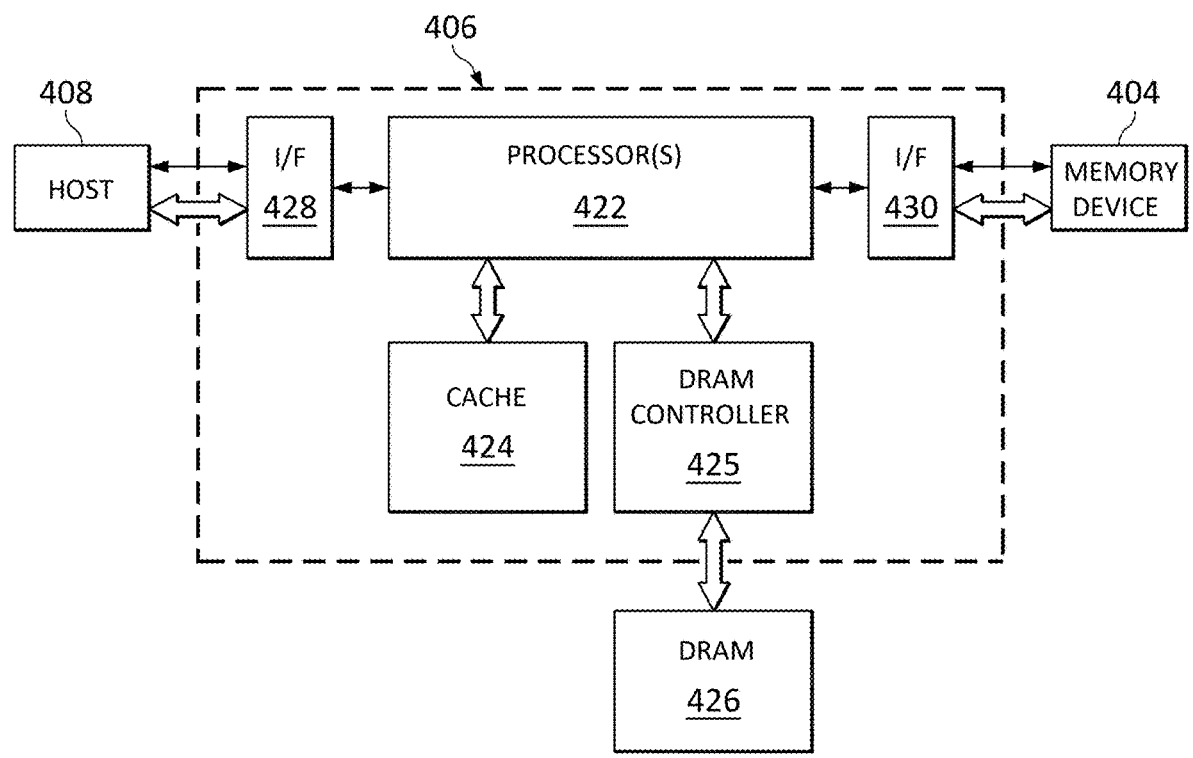
FIG. 4 illustrates a block diagram of an example memory controller, in accordance with some aspects of the present disclosure.

FIG. 4 illustrates a block diagram of an example memory controller 406, in accordance with some aspects of the present disclosure. The memory controller 406 can include one or more processors 422, and one or more memories including one or more of a cache 424 and/or another type of data store. FIG. 4 shows a Dynamic Random Access Memory (DRAM) 426 as being independent from the memory controller 406. However, in some other implementations, the DRAM 426 can be included as part of the memories included in the memory controller 406. In some implementations, the memory controller 406 can include a DRAM controller 425 for the DRAM 426. The memory controller 406 can also include an interface (I/F) 428 (also referred to as a "front-end interface") to a host 408 and an interface (I/F) 430 (also referred to as a "back-end interface") to a memory device 404. In some implementations, the interface 428 can receive instructions and data from the host 408 and forward the instructions and data to the processors 422 and the DRAM 426, respectively. In some implementations, the interface 430 can transfer control signals and data from the processors 422 and the DRAM 426, respectively, to the memory device 404.

In some implementations, the processors 422 can include an Arithmetic Logic Unit (ALU) configured to perform arithmetic and/or logical operations. The memory device 404, the one or more memories of the memory controller 406 such as the cache 424, or a combination of these can store programming instructions which, when loaded into the processors 422, can be executed by the processors 422 to perform various functions of the memory controller 406, such as the functions described in this disclosure. As an example, the memory controller 406 is configured to perform functions such as sending read commands, page transfer commands, and read-out commands, and performing soft decoding based on the read-out data.

Figure 5:
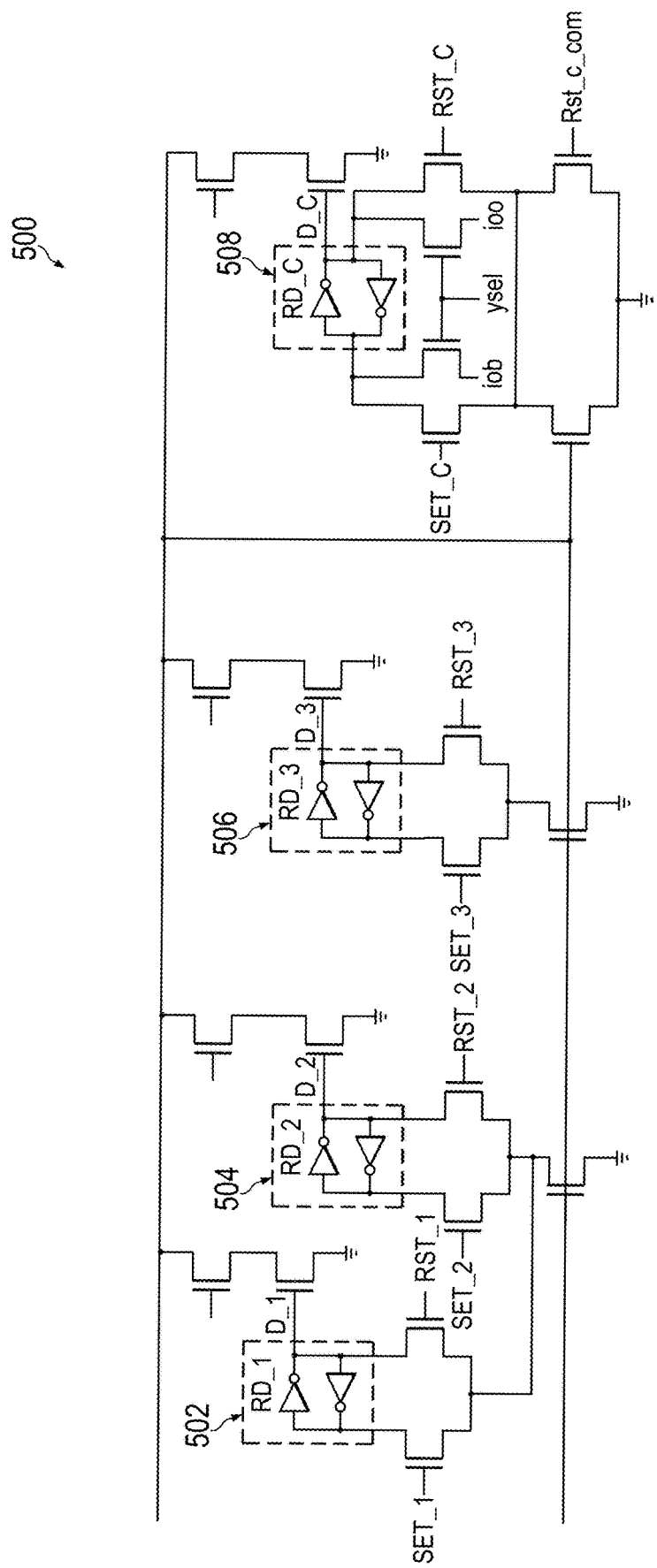
FIG. 5 illustrates a part of an example page buffer of a memory device, according to some aspects of the present disclosure.

In some implementations, a memory device (e.g., the memory device 104, the memory device 304, or the memory device 404) can also include a periphery circuit that can include digital, analog, and/or mixed-signal circuits to support functions of the memory block, such as a page buffer. FIG. 5 illustrates a part of an example page buffer 500 of a memory device, according to some aspects of the present disclosure. The part of the example page buffer 500 includes data latches 502, 504, and 506, and a cache latch 508. In some implementations, the memory device can store soft data in two of the three data latches 502, 504, and 506, and store hard data in one of the three data latches 502, 504, and 506. For example, the memory device can store first soft data in the data latch 502, second soft data in the data latch 504, and hard data in the data latch 506. In some cases, the memory device can copy data stored in the data latch 502, the data latch 504, or the data latch 506 to the cache latch 508 based on, for example, a page transfer command. Cache latch 508 can be configured to cache data before the data is sent out to a memory controller (e.g., the memory controller 106, the memory controller 306, or the memory controller 406). In some cases, the memory device can send a portion of the data (e.g., a portion of the first soft data, a portion of the second soft data, or a portion of the hard data) stored in the cache latch to the memory controller based on, for example, a read-out command. More details are described with respect to FIG. 6.

Figure 6:
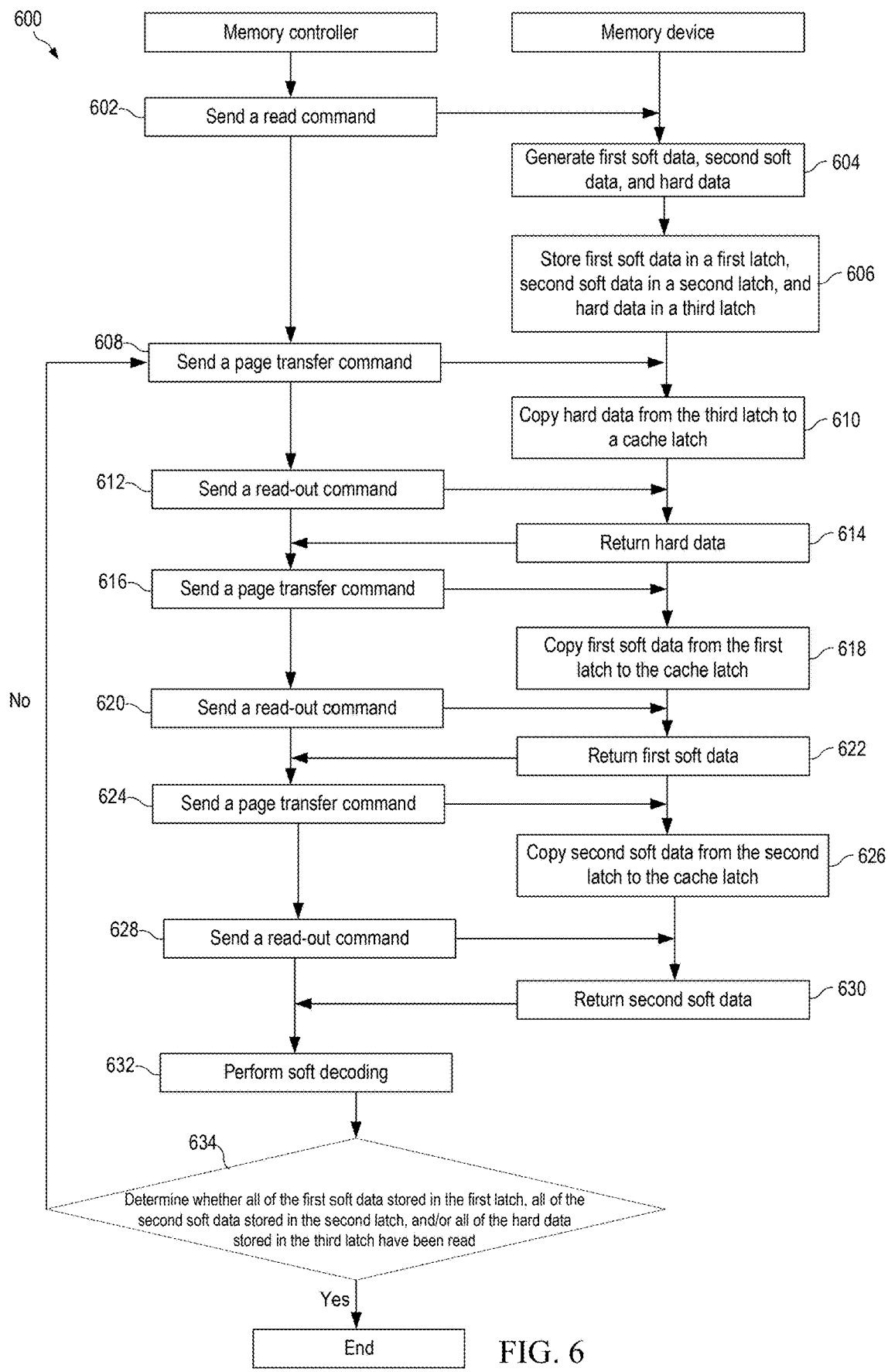
FIG. 6 is a swimlane diagram of an example method for performing soft decoding in a memory system, in accordance with some aspects of the present disclosure.

FIG. 6 is a swimlane diagram of an example method 600 for performing soft decoding in a memory system, in accordance with some aspects of the present disclosure. The method 600 can be performed by a memory controller (e.g., the memory controller 106, the memory controller 306, or the memory controller 406) and a memory device (e.g., the memory device 104, the memory device 304, or the memory device 404). The method 600 will be described as being performed by a memory system having a memory controller and a memory device, programmed appropriately in accordance with this disclosure. The memory controller is coupled to the memory device and to the host. The memory device includes a memory cell array having a number of memory cells. In some implementations, some or all of the operations in the method 600 can be implemented based on the techniques described in connection with FIGS. 1-5. The operations shown in the method 600 may not be exhaustive and other operations can be performed as well before, after, or between any of the illustrated operations. Further, some of the operations may be performed simultaneously, or in a different order than shown in FIG. 6.

At 602, the memory controller sends a read command to the memory device. In some cases, the memory controller continuously scans the pages of data in the memory device. When the memory controller detects a page having high failed bit count (FBC), the memory controller can determine that soft decoding needs to be performed for the data recovery of the page. Accordingly, the memory controller can send the read command to the memory device to initiate the soft decoding.

Figure 7:
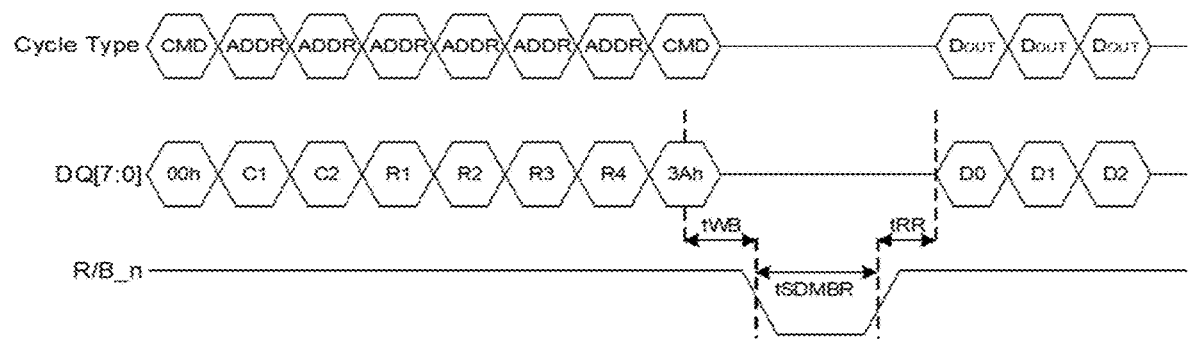
FIG. 7 is a clock cycle diagram of an example read command, in accordance with some aspects of the present disclosure.

In some implementations, the read command is a soft data multiple bit read command. FIG. 7 is a clock cycle diagram of an example read command, in accordance with some aspects of the present disclosure. As shown in FIG. 7, the read command can be an opcode (00h) with six address cycles and can be followed by a confirm command (3Ah). In some cases, it takes a period of soft data multiple bit read time (tSDMBR) to complete the soft data multiple bit read operation. The maximum of tSDMBR can be, for example, 5 tR.

At 604, in response to receiving the read command, the memory device generates first soft data, second soft data, and hard data. In some cases, the first soft data and/or the second soft data is generated based on an XOR operation of two pieces of soft data. For example, the memory device can read a first piece of soft data, read a second piece of soft data, and perform the XOR operation on the first piece of soft data and the second piece of soft data to generate the first soft data or the second soft data.

Figure 8:
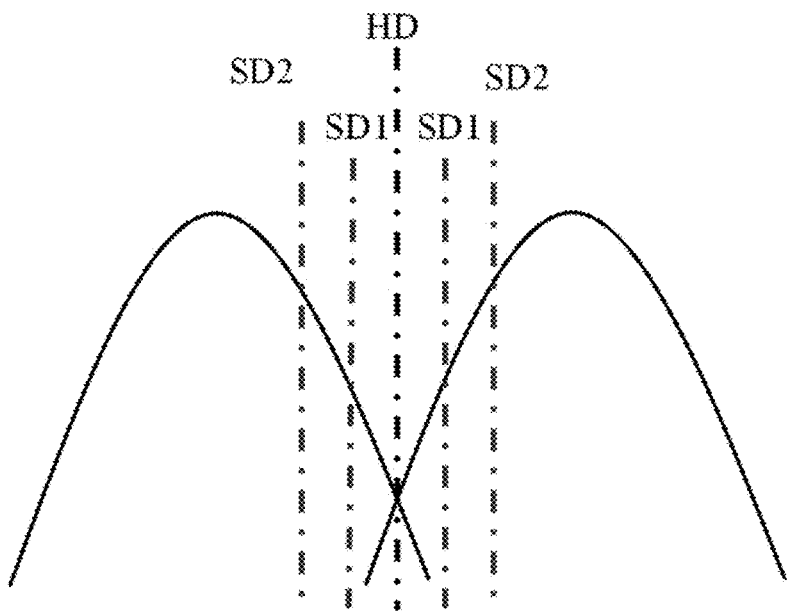
FIG. 8 is a schematic diagram of an example set of soft data voltages and hard data voltage, in accordance with some aspects of the present disclosure.

In some cases, each of the first soft data, the second soft data, and the hard data includes a quantity of bits less than or equal to the size of a page (e.g., 16 KB) or another unit of a read operation of the memory device. Accordingly, the two pieces of soft data used to generate the first soft data or the second soft data also includes the same amount of bits (e.g., 16 KB) as the first soft data or the second soft data. Take the first soft data for example. For each bit of the two pieces of soft data used to generate the first soft data, the memory device can generate the bit based on, for example, reading a voltage corresponding to the bit. FIG. 8 is a schematic diagram of an example set of soft data voltages and hard data voltage, in accordance with some aspects of the present disclosure. For example, the memory device can read voltages corresponding to the two bits of soft data (e.g., the two SD1 shown in FIG. 8). The memory device can compare each voltage of the two read voltages with a decision threshold to determine whether the read voltage represents a 0 or a 1. The memory device can then perform an XOR operation on the two bits of soft data to generate a result of 0 or 1, which represents a bit of the first soft data. This process can be repeated to generate each bit of the first soft data. Generating the second soft data can be similar to generating the first soft data. For example, generating the second soft data can be based on reading voltages corresponding to the two SD2 shown in FIG. 8. Similarly, for each bit of the hard data, the memory device can generate the bit based on, for example, reading a voltage corresponding to the bit (e.g., the HD shown in FIG. 8). The memory device can compare the read voltage with a decision threshold to determine whether the read voltage represents a 0 or a 1, which represents a bit of the hard data. This process can be repeated to generate each bit of the hard data.

At 606, the memory device stores the first soft data in a first latch, the second soft data in a second latch, and the hard data in a third latch. For example, each of the first latch, the second latch, and the third latch can be one of the three data latches 502, 504, and 506 shown in FIG. 5. In some cases, the size of each of the first soft data, the second soft data, and the hard data is the same as the size of its corresponding latch. For example, assuming that the size of each of the first soft data, the second soft data, and the hard data is 16 KB, the size of each latch is also 16 KB.

At 608, the memory controller sends a first page transfer command to the memory device. The page transfer command can indicate a selected latch from the first latch, the second latch, or the third latch to transfer data in the selected latch to the cache latch. For example, the page transfer command can include one of three values 0, 1, and 2, where 0 represents transferring hard data stored in the third latch to the cache latch, 1 represents transferring the first soft data stored in the first latch to the cache latch, and 2 represents transferring the second soft data stored in the second latch to the cache latch. The page transfer command can include additional or different values, bitmap, or other representations to indicate the selected latch.

In some cases, the page transfer command indicates transferring all data of the selected latch (e.g., the entire 16 KB) to the cache latch. In other cases, the page transfer command indicates transferring a portion of the data in the selected latch (e.g., 2 KB out of 16 KB) to the cache latch. In such case, in addition to indicating a selected latch from the first latch, the second latch, or the third latch, the page transfer command can also indicate the portion of the data in the selected latch, such as an address of the portion of data in the selected latch. This portion of data in the selected latch can subsequently be sent from the selected latch to the cache latch, and then from the cache latch to the memory controller.

Figure 9:
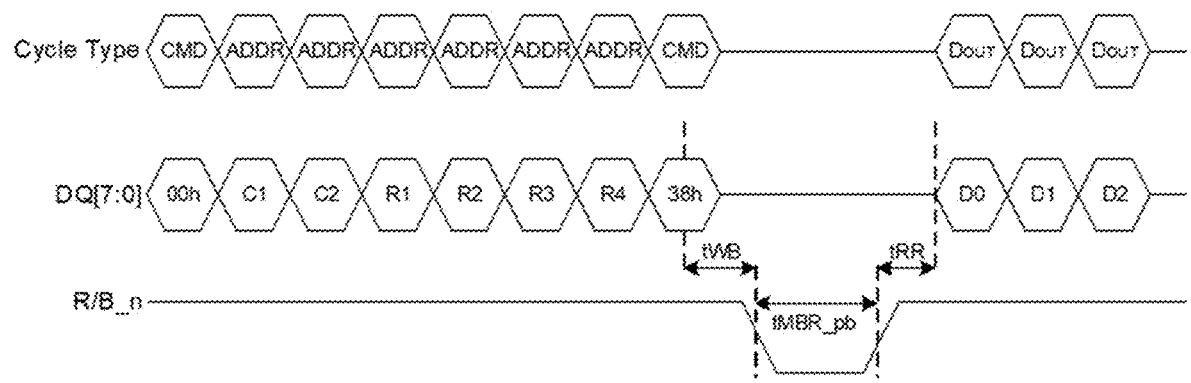
FIG. 9 is a clock cycle diagram of an example page transfer command, in accordance with some aspects of the present disclosure.

FIG. 9 is a clock cycle diagram of an example page transfer command, in accordance with some aspects of the present disclosure. As shown in FIG. 9, the page transfer command can be an opcode (38h) with one address cycle. In some cases, it takes a period of soft data multiple bit page buffer transfer time (tMBR_pb) to complete the page buffer data transfer operation.

At 610, the memory device copies, based on the first page transfer command, the hard data from the third latch to the cache latch. The first page transfer command can indicate that the selected latch is the third latch.

At 612, the memory controller sends a first read-out command to the memory device. In some cases, the read-out command indicates a portion of data stored in the cache latch to be transferred to the memory controller. For example, the first read-out command indicates a portion of the hard data (e.g., 2 KB out of 16 KB) to transfer from the cache latch to the memory controller.

At 614, the memory device sends the portion of the hard data from the cache latch to the memory controller. In some examples, a size of the portion of the hard data is less than or equal to a cache size of the memory controller, and a size of the hard data is larger than the cache size of the memory controller. For example, the size of the portion of the hard data can be 2 KB, the cache size of the memory controller can also be 2 KB, and the size of the hard data can be 16 KB.

At 616, the memory controller sends a second page transfer command to the memory device. The second page transfer command can indicate that the first latch is selected to transfer data from the first latch to the cache latch.

At 618, the memory device copies, based on the second page transfer command, the first soft data from the first latch to the cache latch.

At 620, the memory controller sends a second read-out command to the memory device. The second read-out command can indicate a portion of the first soft data (e.g., 2 KB out of 16 KB) to transfer from the cache latch to the memory controller.

At 622, the memory device sends the portion of the first soft data from the cache latch to the memory controller.

At 624, the memory controller sends a third page transfer command to the memory device. The third page transfer command can indicate that the second latch is selected to transfer data from the second latch to the cache latch.

At 626, the memory device copies, based on the third page transfer command, the second soft data from the second latch to the cache latch.

At 628, the memory controller sends a third read-out command to the memory device. The third read-out command can indicate a portion of the second soft data (e.g., 2 KB out of 16 KB) to transfer from the cache latch to the memory controller.

At 630, the memory device sends the portion of the second soft data from the cache latch to the memory controller.

At 632, the memory controller performs soft decoding based on the portion of the hard data, the portion of the first soft data, and the portion of the second soft data. In some implementations, soft decoding can be performed after two or more portions of the hard data, first soft data, and the second soft data are obtained by the memory controller. In some implementations, soft decoding can be performed based on all the first soft data, the second soft data, and the hard data are obtained by the memory controller, for example, after step 634.

At 634, the memory controller determines whether all of the first soft data stored in the first latch, all of the second soft data stored in the second latch, and/or all of the hard data stored in the third latch have been read. In some implementation, in response to determining that all of the first soft data stored in the first latch, all of the second soft data stored in the second latch, and all of the hard data stored in the third latch have been read, the method 600 can end. In some implementation, in response to determining that not all of the data stored in the three latches have been read, all or some of step 608 to step 634 can be repeated until all of the data stored in the three latches have been read. For example, if not all of the hard data stored in the third latch have been read, the method 600 can go back to step 608. As another example, if all of the hard data stored in the third latch have been read, but not all of the first soft data stored in the first latch have been read, the method 600 can go back to step 616. As yet another example, if all of the hard data stored in the third latch have been read and all of the first soft data stored in the first latch have been read, but not all of the second soft data stored in the second latch have been read, the method 600 can go back to step 624. Additional or different order or steps can be performed to read all of the data stored in the three latches. In some implementation, assuming the size of the data stored in each of the three latches is 16 KB and each iteration of steps 608 to 634 reads 2 KB of data, the steps 608 to 634 can be performed 8 times to read all the data stored in the three latches.

In some implementations, the order of obtaining portions of the hard data, the first soft data, and the second soft data can be different from steps 610-630. For example, the memory controller may request a portion of the first soft data before requesting a portion of the hard data and a portion of the second soft data. Other variations can be implemented without departing from the spirit and scope of the present disclosure.

In some implementations, a memory device may include other than 3 data latches (e.g., 502, 504, and 506) and more than 1 cache latch. In some implementations, the example method 600 can be adapted accordingly, for example, to use the available data latches and cache latch, without departing from the spirit and scope of the present disclosure.

In some implementations, the soft data multiple bit read protocol and the soft data single bit read protocol can coexist and/or supported by the memory system. Table 1 shows an example for using a feature field to enable either the soft data multiple bit read protocol or the soft data single bit read protocol. As shown in Table 1, the bit 0 of parameter P1 is the feature field used to enable or disable the soft data multiple bit read protocol. The bit 0 is set to 0 by default, representing that the soft data multiple bit read protocol is enabled. On the other hand, when the bit 0 is set to 1, the soft data multiple bit read protocol is disabled.

TABLE 1

| Soft data multiple bit read table: FA = C7h | | | | | | | | |
|---|---|---|---|---|---|---|---|---|
| Parameter P1 | 7 | 6 | 5 | 4 Reserved | 3 | 2 | 1 | 0 Multiple bit read enable |
| P2 | | | | Reserved | | | | |
| P3 | | | | Reserved | | | | |
| P4 | | | | Reserved | | | | |

FIG. 10 shows an example table for soft data single bit read offset, in accordance with some aspects of the present disclosure. FIG. 11 shows an example table for soft data multiple bit read offset, in accordance with some aspects of the present disclosure. When the soft data multiple bit read protocol is disabled, the table shown in FIG. 10 can be used for looking up the soft data single bit read offset. On the other hand, when the soft data multiple bit read protocol is enabled, the table shown in FIG. 11 can be used for looking up the soft data multiple bit read offset.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

One aspect of the present disclosure features a method including sending, by a memory controller, a read command to a memory device. The method further includes storing, by the memory device based on the read command, first soft data in a first latch, second soft data in a second latch, and hard data in a third latch. The method further includes sending, by the memory controller, a first page transfer command to the memory device, where the first page transfer command indicates a selected latch from the first latch, the second latch, or the third latch to transfer data in the selected latch to a cache latch.

Another aspect of the present disclosure features a memory device including a memory cell array and a peripheral circuit, where the memory cell array includes memory cells. The peripheral circuit is configured to receive a read command from a memory controller. The peripheral circuit is further configured to store, based on the read command, first soft data in a first latch, second soft data in a second latch, and hard data in a third latch. The peripheral circuit is further configured to receive a first page transfer command from the memory controller, where the first page transfer command indicates a selected latch from the first latch, the second latch, or the third latch to transfer data in the selected latch to a cache latch.

Another aspect of the present disclosure features a memory system. The memory system includes a memory device including a memory cell array, where the memory cell array includes memory cells, and a memory controller coupled to the memory device. The memory system is configured to perform operations including sending, by the memory controller, a read command to the memory device. The operations further include storing, by the memory device based on the read command, first soft data in a first latch, second soft data in a second latch, and hard data in a third latch. The operations further include sending, by the memory controller, a first page transfer command to the memory device, where the first page transfer command indicates a selected latch from the first latch, the second latch, or the third latch to transfer data in the selected latch to a cache latch.

The foregoing and other described aspects of the present disclosure can each, optionally, include one or more of the following features.

In some implementations, the method includes copying, by the memory device based on the first page transfer command, the hard data from the third latch to the cache latch. The method further includes sending, by the memory controller, a first read-out command to the memory device. The method further includes sending, by the memory device, a portion of the hard data from the cache latch to the memory controller, where a size of the portion of the hard data is less than or equal to a cache size of the memory controller, and a size of the hard data is larger than the cache size of the memory controller.

In some implementations, the method includes sending, by the memory controller, a second page transfer command to the memory device, where the second page transfer command indicates the first latch is selected to transfer data from the first latch to the cache latch. The method further includes copying, by the memory device based on the second page transfer command, the first soft data from the first latch to the cache latch. The method further includes sending, by the memory controller, a second read-out command to the memory device. sending, by the memory device, a portion of the first soft data from the cache latch to the memory controller.

In some implementations, the method includes sending, by the memory controller, a third page transfer command to the memory device, where the third page transfer command indicates the second latch is selected to transfer data from the second latch to the cache latch. The method further includes copying, by the memory device based on the third page transfer command, the second soft data from the second latch to the cache latch. The method further includes sending, by the memory controller, a third read-out command to the memory device. The method further includes sending, by the memory device, a portion of the second soft data from the cache latch to the memory controller.

In some implementations, the method includes performing, by the memory controller, soft decoding based on the portion of the hard data, the portion of the first soft data, and the portion of the second soft data.

In some implementations, the method includes determining, by the memory controller, whether all of the hard data stored in the third latch have been read. The method further includes in response to determining that not all of the hard data in the third latch have been read, sending, by the memory controller, a fourth page transfer command to the memory device, where the fourth page transfer command indicates the third latch is selected to transfer data from the third latch to the cache latch. The method further includes copying, by the memory device based on the fourth page transfer command, the hard data from the third latch to the cache latch. The method further includes sending, by the memory controller, a fourth read-out command to the memory device. The method further includes sending, by the memory device, a second portion of the hard data from the cache latch to the memory controller.

In some implementations, the first soft data is generated based on an XOR operation of two pieces of soft data.

In some implementations, the method includes reading, by the memory device, a first piece of soft data. The method further includes reading, by the memory device, a second piece of soft data. The method further includes performing, by the memory device, the XOR operation on the first piece of soft data and the second piece of soft data to generate the first soft data.

In some implementations, the read command is a soft data multiple bit read command.

In some implementations, the method further includes in response to receiving the read command, generating, by the memory device, the first soft data, the second soft data, and the hard data.

In some implementations, the first page transfer command includes an address of a portion of data in the selected latch to be sent from the cache latch to the memory controller.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method for performing soft decoding in a memory system, comprising:
    sending, by a memory controller, a read command to a memory device;
    storing, by the memory device based on the read command, first soft data in a first latch, second soft data in a second latch, and hard data in a third latch; and
    sending, by the memory controller, a first page transfer command to the memory device, wherein the first page transfer command indicates a selected latch from the first latch, the second latch, or the third latch to transfer data in the selected latch to a cache latch.

2. The method according to claim 1, wherein the selected latch comprises the third latch, and wherein the method comprises:
    copying, by the memory device based on the first page transfer command, the hard data from the third latch to the cache latch;
    sending, by the memory controller, a first read-out command to the memory device; and
    sending, by the memory device, a portion of the hard data from the cache latch to the memory controller, wherein a size of the portion of the hard data is less than or equal to a cache size of the memory controller, and a size of the hard data is larger than the cache size of the memory controller.

3. The method according to claim 2, comprising:
    sending, by the memory controller, a second page transfer command to the memory device, wherein the second page transfer command indicates the first latch is selected to transfer data from the first latch to the cache latch;
    copying, by the memory device based on the second page transfer command, the first soft data from the first latch to the cache latch;
    sending, by the memory controller, a second read-out command to the memory device; and
    sending, by the memory device, a portion of the first soft data from the cache latch to the memory controller.

4. The method according to claim 3, comprising:
    sending, by the memory controller, a third page transfer command to the memory device, wherein the third page transfer command indicates the second latch is selected to transfer data from the second latch to the cache latch;
    copying, by the memory device based on the third page transfer command, the second soft data from the second latch to the cache latch;
    sending, by the memory controller, a third read-out command to the memory device; and
    sending, by the memory device, a portion of the second soft data from the cache latch to the memory controller.

5. The method according to claim 4, comprising:
    performing, by the memory controller, soft decoding based on the portion of the hard data, the portion of the first soft data, and the portion of the second soft data.

6. The method according to claim 4, comprising:
    determining, by the memory controller, whether all of the hard data stored in the third latch have been read;
    in response to determining that not all of the hard data in the third latch have been read, sending, by the memory controller, a fourth page transfer command to the memory device, wherein the fourth page transfer command indicates the third latch is selected to transfer data from the third latch to the cache latch;
    copying, by the memory device based on the fourth page transfer command, the hard data from the third latch to the cache latch;
    sending, by the memory controller, a fourth read-out command to the memory device; and
    sending, by the memory device, a second portion of the hard data from the cache latch to the memory controller.

7. The method according to claim 1, wherein the first soft data is generated based on an XOR operation of two pieces of soft data.

8. The method according to claim 7, comprising:
reading, by the memory device, a first piece of soft data;
reading, by the memory device, a second piece of soft data; and
performing, by the memory device, the XOR operation on the first piece of soft data and the second piece of soft data to generate the first soft data.

9. The method according to claim 1, wherein the read command is a soft data multiple bit read command.

10. The method according to claim 1, comprising:
in response to receiving the read command, generating, by the memory device, the first soft data, the second soft data, and the hard data.

11. The method according to claim 1, wherein the first page transfer command comprises an address of a portion of data in the selected latch to be sent from the cache latch to the memory controller.

12. A memory device comprising a memory cell array and a peripheral circuit, wherein the memory cell array comprises memory cells, and the peripheral circuit is configured to:
receive a read command from a memory controller;
store, based on the read command, first soft data in a first latch, second soft data in a second latch, and hard data in a third latch; and
receive a first page transfer command from the memory controller, wherein the first page transfer command indicates a selected latch from the first latch, the second latch, or the third latch to transfer data in the selected latch to a cache latch.

13. The memory device according to claim 12, wherein the selected latch comprises the third latch, and wherein the peripheral circuit is configured to:
copy, based on the first page transfer command, the hard data from the third latch to the cache latch;
receive a first read-out command from the memory controller; and
send a portion of the hard data from the cache latch to the memory controller, wherein a size of the portion of the hard data is less than or equal to a cache size of the memory controller, and a size of the hard data is larger than the cache size of the memory controller.

14. The memory device according to claim 13, wherein the peripheral circuit is configured to:
receive, from the memory controller, a second page transfer command, wherein the second page transfer command indicates the first latch is selected to transfer data from the first latch to the cache latch;
copy, based on the second page transfer command, the first soft data from the first latch to the cache latch;
receive, from the memory controller, a second read-out command; and
send a portion of the first soft data from the cache latch to the memory controller.

15. The memory device according to claim 14, wherein the peripheral circuit is configured to:
receive, from the memory controller, a third page transfer command, wherein the third page transfer command indicates the second latch is selected to transfer data from the second latch to the cache latch;
copy, based on the third page transfer command, the second soft data from the second latch to the cache latch;
receive, from the memory controller, a third read-out command; and
send a portion of the second soft data from the cache latch to the memory controller.

16. The memory device according to claim 14, wherein the peripheral circuit is configured to:
receive, from the memory controller, a fourth page transfer command, wherein the fourth page transfer command indicates the third latch is selected to transfer data from the third latch to the cache latch;
copy, based on the fourth page transfer command, the hard data from the third latch to the cache latch;
receive, from the memory controller, a fourth read-out command; and
send a second portion of the hard data from the cache latch to the memory controller.

17. A memory system, comprising:
a memory device comprising a memory cell array, wherein the memory cell array comprises memory cells, and
a memory controller coupled to the memory device, wherein the memory system is configured to perform operations comprising:
sending, by the memory controller, a read command to the memory device;
storing, by the memory device based on the read command, first soft data in a first latch, second soft data in a second latch, and hard data in a third latch; and
sending, by the memory controller, a first page transfer command to the memory device, wherein the first page transfer command indicates a selected latch from the first latch, the second latch, or the third latch to transfer data in the selected latch to a cache latch.

18. The memory system according to claim 17, wherein the selected latch comprises the third latch, and wherein the operations comprise:
copying, by the memory device based on the first page transfer command, the hard data from the third latch to the cache latch;
sending, by the memory controller, a first read-out command to the memory device; and
sending, by the memory device, a portion of the hard data from the cache latch to the memory controller, wherein a size of the portion of the hard data is less than or equal to a cache size of the memory controller, and a size of the hard data is larger than the cache size of the memory controller.

19. The memory system according to claim 18, the operations comprising:
sending, by the memory controller, a second page transfer command to the memory device, wherein the second page transfer command indicates the first latch is selected to transfer data from the first latch to the cache latch;
copying, by the memory device based on the second page transfer command, the first soft data from the first latch to the cache latch;
sending, by the memory controller, a second read-out command to the memory device; and
sending, by the memory device, a portion of the first soft data from the cache latch to the memory controller.

20. The memory system according to claim 19, the operations comprising:
sending, by the memory controller, a third page transfer command to the memory device, wherein the third page transfer command indicates the second latch is selected to transfer data from the second latch to the cache latch;

copying, by the memory device based on the third page transfer command, the second soft data from the second latch to the cache latch;

sending, by the memory controller, a third read-out command to the memory device; and sending, by the memory device, a portion of the second soft data from the cache latch to the memory controller.

\* \* \* \* \*